US006290603B1

(12) United States Patent
Luciano, Jr.

(10) Patent No.: US 6,290,603 B1
(45) **Date of Patent: *Sep. 18, 2001**

(54) GAMING SYSTEM WITH ZERO-VOLATILITY HOLD

(75) Inventor: Robert A. Luciano, Jr., Reno, NV (US)

(73) Assignee: International Game Technology, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 09/359,234

(22) Filed: Jul. 22, 1999

Related U.S. Application Data

(63) Continuation of application No. 08/895,966, filed on Jul. 17, 1997.

(60) Provisional application No. 60/022,194, filed on Jul. 19, 1996.

(51) Int. Cl.[7] .......... A63F 13/00

(52) U.S. Cl. .......... 463/25; 463/26

(58) Field of Search .......... 463/25, 26, 27, 463/28

(56) References Cited

U.S. PATENT DOCUMENTS

| | | | | |
|---|---|---|---|---|
| 5,275,400 | * | 1/1994 | Weingardt et al. | 273/85 CP |
| 5,476,259 | * | 12/1995 | Weingardt | 273/85 CP |
| 5,639,088 | * | 6/1997 | Schneider et al. | 273/138.2 |

* cited by examiner

*Primary Examiner*—Valencia Martin-Wallace
*Assistant Examiner*—Julie Kasick
(74) *Attorney, Agent, or Firm*—George H. Gerstman; Seyfarth Shaw

(57) ABSTRACT

A gaming system is provided which permits the hold value to be determined independently of the distribution of winning outcomes, e.g., to avoid or prevent volatility in the hold value. Preferably each time a wager is placed, a hold value (such as a predetermined and/or fixed percentage) is retained and the remainder is allocated to one or more prizes. Preferably, the current prize amounts corresponding to various potential winning game outcomes are displayed when a game is won, the displayed amount corresponding to the type of win paid. Preferably, a portion of wages is retained as a background amount to at least partially replenish a paid-out prize.

24 Claims, 4 Drawing Sheets

GAMING SYSTEM WITH ZERO-VOLATILITY HOLD

This is a continuation of Ser. No. 08/895,966 filed Jul. 17, 1997, incorporated by reference.

This application claims priority based on U.S. provisional application Ser. No. 60/022,194 filed Jul. 19, 1996 which is incorporated herein by reference.

The present invention relates to a gaming system and in particular to a system in which the prizes are related to the amount of wagers.

BACKGROUND INFORMATION

In a typical gaming system, it is important to avoid the potential for players to predict when a particular gaming terminal will have a win, and thus electronic gaming terminals are typically configured to provide wins on a random or pseudo-random basis, often using a random number generator. Gaming devices typically use some of the wagering revenues to fund prizes, with the remainder (referred to as a "hold") being retained by the casino or other game operator. Previous devices, while providing prizes on a random basis, have provided one or more prize payouts which are of a fixed nature, i.e., which are predetermined and substantially unrelated to the amount of wagers that have been placed since the last win. For example, in a video poker device, a machine may be configured to output a first prize amount in response to a hand which has a pair and a second prize amount to a hand which has three of a kind, and so forth. The prize amounts corresponding to each winning hand are, typically, predetermined and constant. In a slot machine game, jackpots or other prizes are paid upon obtaining particular reel combinations. Typically, such gaming devices are configured so that on average (i.e., over a relatively long period of time, which may encompass many games, a number of which may be winning games) the amount of hold for a terminal will approach a predetermined target average hold. However, over a relatively short range (e.g., over a period representing two or three wins), the amount of hold for a machine, will typically be quite volatile. This is particularly true when the hold is considered on the basis of the ratio of the money which is held since the last prize to the total amount wagered since the last prize.

Previous systems which have provided for random wins with fixed payoffs have involved a banked game, i.e. a game in which players compete against the house (or "bank") for a prize. This is at least partly because wins which are randomly distributed will occasionally occur close together, so that a subsequent prize is not fully funded by wages that have been placed since the previous prize.

Some previous gaming systems have included a feature which provides for a so-called progressive prize which increases in value as more players wager to win the prize. However, such previous devices have been implemented so that players wager for non-progressive prizes at the same time that they are playing a "progressive" game and thus there devices still have substantial volatility in the hold value.

Accordingly, it would be useful to provide a gaming system which avoids and, preferably substantially eliminates, volatility from the hold value. It would be useful to provide a device which can be implemented as a non-baked game, i.e., in which there is not a potential for a prize which has not already been "covered" by previous wagers (and which, thus must be covered by the house or "bank").

SUMMARY OF THE INVENTION

According to the present invention, a gaming system is provided in which preferably all prizes of the game are covered by (i.e., do not exceed) the total of the wagers placed since the last win, or the last n wins, less a hold portion of the wagers. In one embodiment, for each wager placed by a player, a certain portion is allocated for the hold and the remainder is allocated to one or more prize meters. Preferably there are multiple prizes and thus multiple prize meters. When a prize is won, the amount of the prize will be the amount accumulated in whichever prize meter corresponds to that particular prize. Furthermore, in one embodiment, prize meters may be further subdivided into visible meters and background meters, with the visible meter representing the amount that will be paid out when the corresponding prize is won, and the background meter representing the starting amount, for that prize, for the next game. Thus, the amount which a player may win for particular winning outcomes in a game will increase as more wagers are made, until a winning combination or outcome, e.g. corresponding to a particular prize meter. Preferably the amount allocated for various winning outcomes is displayed and the visibly-increasing prize amounts is believed to add to the entertainment value of the game.

DETAILED DESCRIPTION OF THE PREFERRED EMBODIMENTS

Figure 1A:
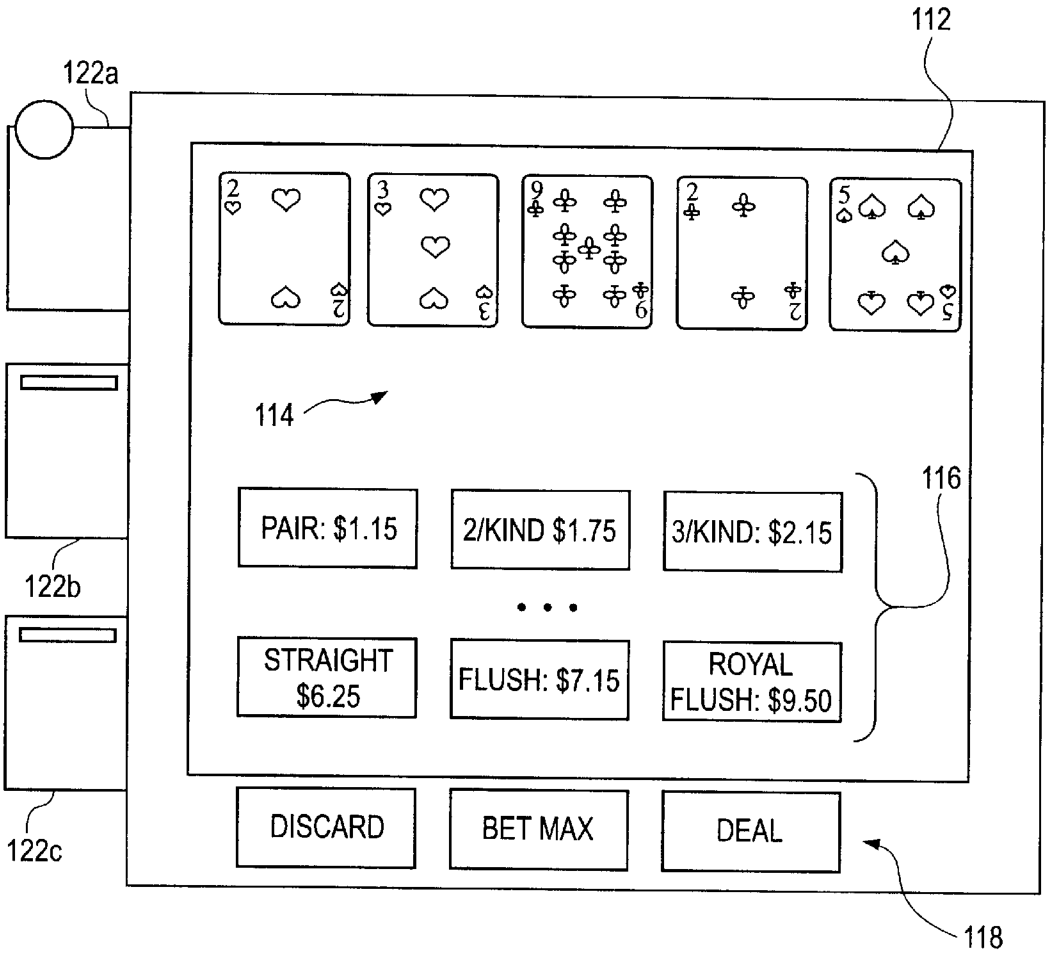
FIG. 1A is a simplified view of a video gaming terminal that can be used in connection with an embodiment of the present invention.
Figure 1B:
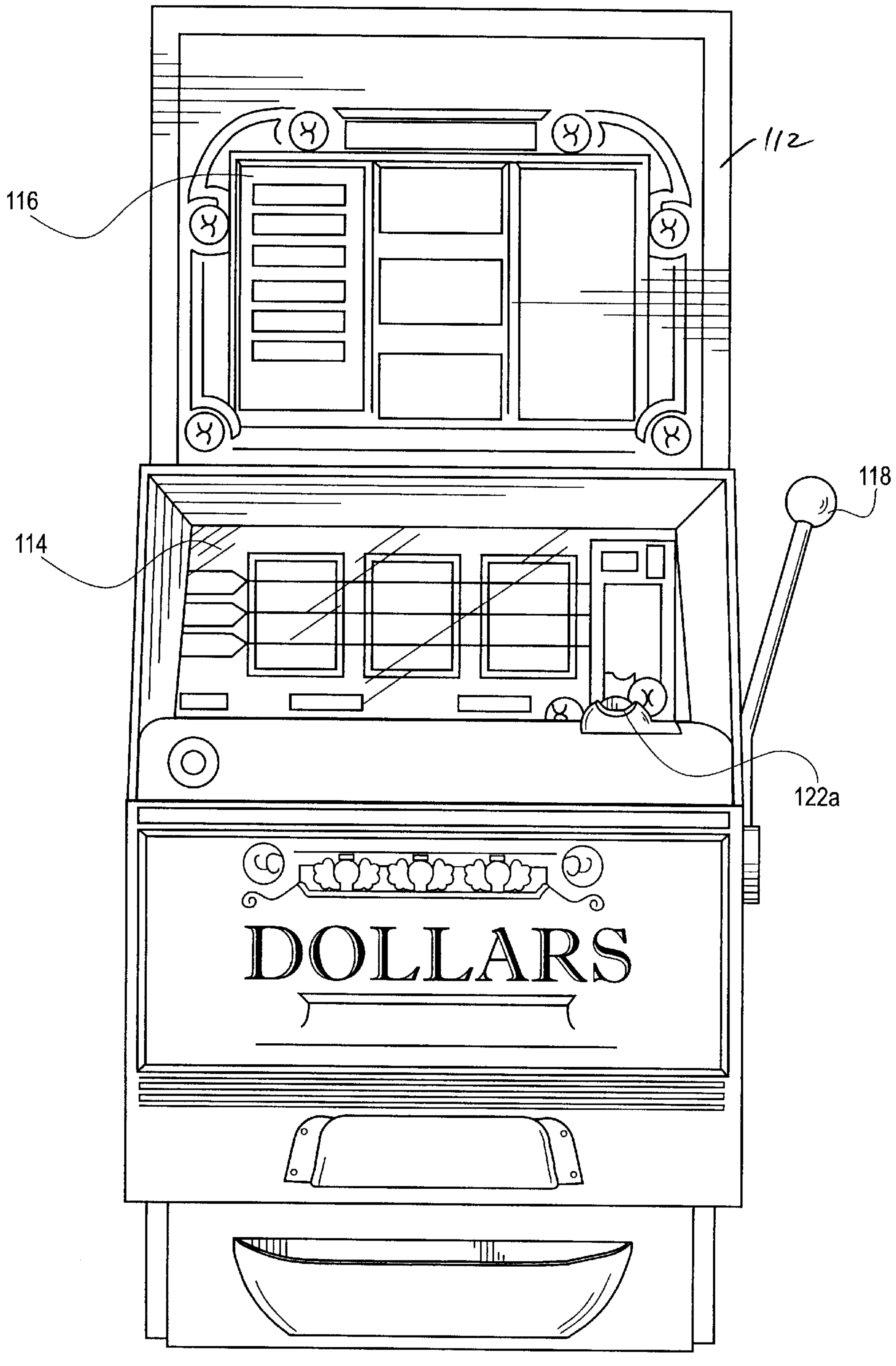
FIG. 1B is a simplified view of a simulated slot machine terminal that can be used in connection with an embodiment of the present invention.

FIGS. 1A and 1B depict gaming terminals which can be used according to embodiments of the present invention. The gaming terminal includes a display screen 112 which has a first portion 114 for displaying the game such as displaying cards (FIG. 1A in the case of a video poker or other electronic card game), simulated slot machine reels (FIG. 1B for use in connection with an electronic slot machine), a number grid (e.g., for use with a keno game terminal) or the like. Preferably the gaming terminal also has an indication of the current value or payout associated with various winning game outcomes such as winning poker hands, winning slot machine reel symbol combinations and the like. In the embodiment of FIGS. 1A and 1B, the winning payouts are displayed in a portion 116 of the display screen. However, it is also possible to provide a separate display such as a CRT, LCD or similar display indicating the amount for one or more of the potential prizes. Various input, output devices are also provided which may include, e.g., a button panel 118 for authorizing or placing wagers, requesting a deal of cards (FIG. 1A), a spin of simulated slot machine reels (FIG. 1B), and the like. Other types of input devices may be used such as a touch screen input, mouse, joystick, keyboard and the like. Also depicted in FIGS. 1A and 1B are wager acceptors such as coin, bill and card acceptors 122*a,* 122*b,* 122*c,* e.g., for permitting players to place wagers.

Figure 2:
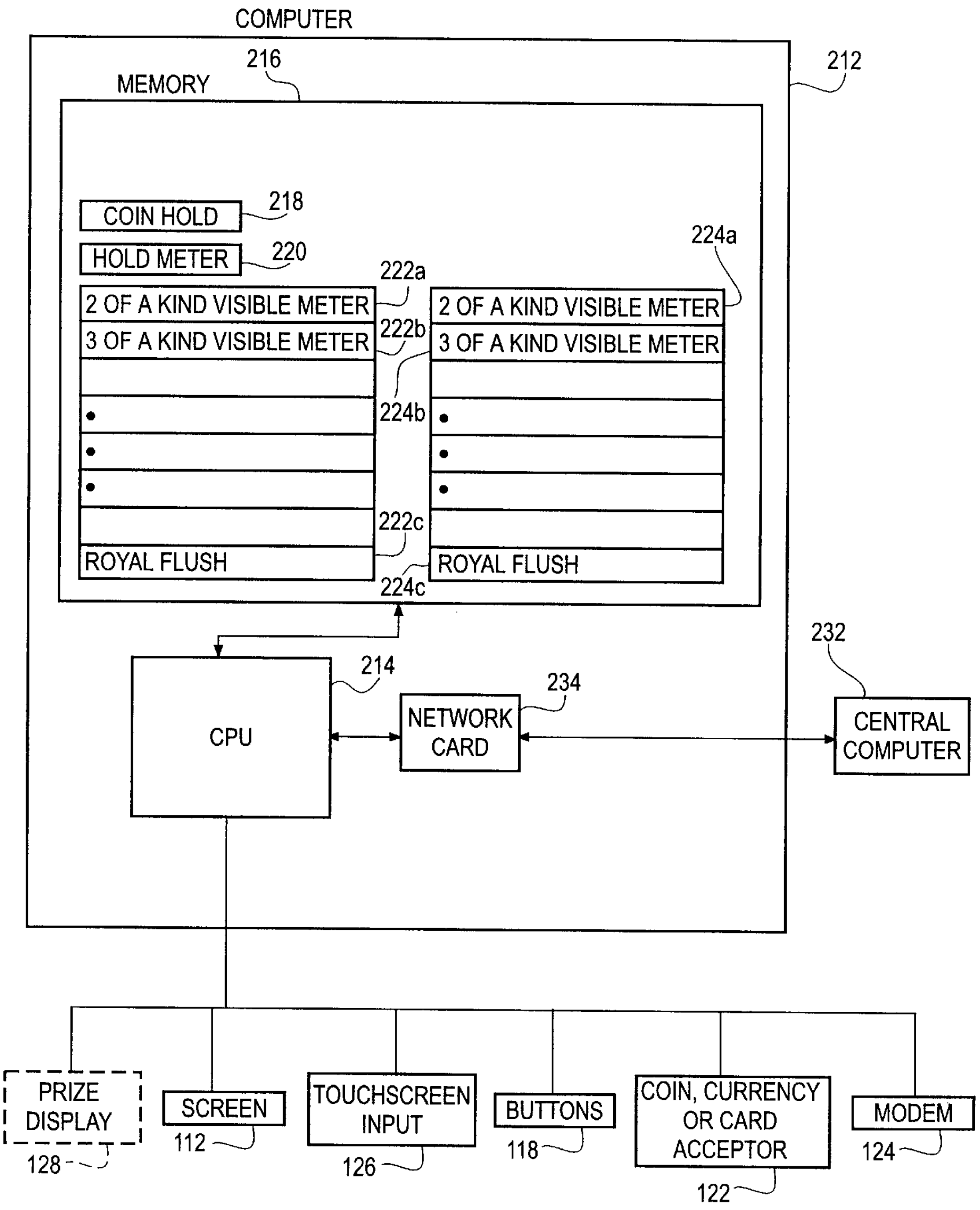
FIG. 2 is a block diagram of a computing system which can be used in connection with controlling a terminal in accordance with one embodiment of the present invention.

As depicted in FIG. 2, the present invention may be implemented using an electronic gaming terminal controlled by a computer 212. Any of a number of types of computers can be used, including computers configured to operate using a Microsoft® disk operating system (DOS), UNIX operating system, and the like. In one embodiment, the present invention may be implemented on an electronic slot machine, such as a standard slot machine available from International Game Technology (IGT), Reno, Nev., which may use, e.g., an 8032 Intel microprocessor, an 80960 Intel microprocessor or the like. The present invention may be implemented on a standard electronic slot machine or a standard electronic poker (or other card game) machine, e.g., by replacing or modifying the software. Those of skill in the software art will understand how to effect such modification or replacement after understanding the present disclosure. In the depicted embodiment, the central processing unit or CPU 214 is coupled to a memory 216 which is used for storing information that may be used to obtain a hold value and various prize values. In one embodiment, prize values are maintained in hardware or software meters for the various prizes. In the depicted embodiment, a first memory location 218 stores total coin drop or "handle" for the machine, i.e., the total of all wagers placed. From this amount, the hold can be calculated, e.g., as a percentage of the total coin drop. (The total of the holds for all previous wagers (in the current day or other accounting period is referred to as the hold pool.) If desired, the hold pool can be stored, e.g., in a software or hardware hold meter 220. Although it is possible to provide a single meter per winning outcome, in the depicted embodiment, there is a separate visible meter 222 and a separate background meter 224 for each possible winning outcome of a game. Thus, the memory 216 also includes a plurality of visible meters 222*a* through *c* and a plurality of background meters 224*a* through *c*. In the depicted embodiment, the game is a video poker game and thus there is one visible meter for two of a kind 222*a,* another visible meter 222*b* for three of a kind, and so forth up through the highest winning outcome, i.e., a meter 222*c* for a royal flush. For use with a slot machine game; there may be visible meters corresponding to three bells, three bars, three oranges, etc.

In the depicted embodiment, the CPU 214 may also be coupled to various peripheral devices, such as the display 112, the coin/currency/card acceptor 122, a modem 124 or other communications link (e.g., for coupling to other gaming terminals and/or casino computers as described more thoroughly below) touchscreen input 126, a prize display 128 and the like.

Figure 3:
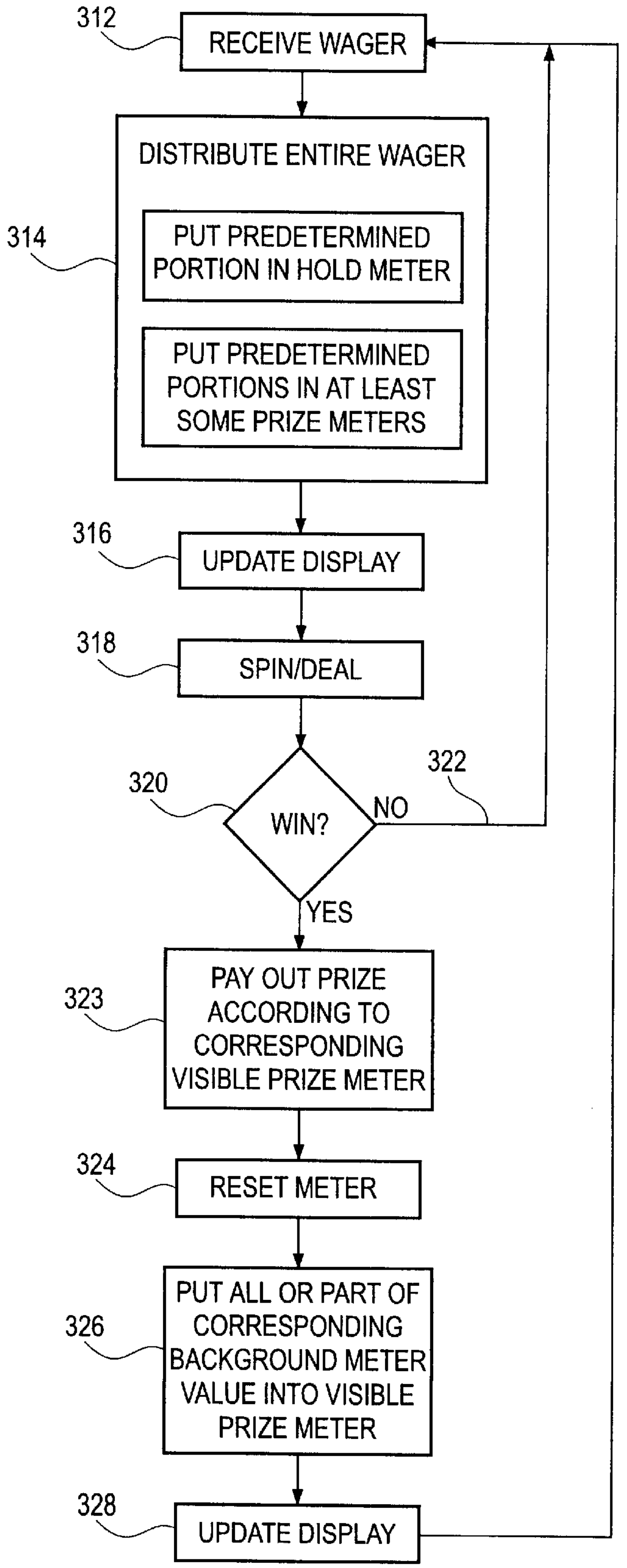
FIG. 3 is a flow chart depicting a procedure for using the gaming system according to an embodiment of the present invention.

As depicted in FIG. 3, once a user places a wager 312 (e.g., using coin/currency/card devices 122 and/or input devices 118), the amount wagered is distributed 314 to the various meters 218, 222, 224. For example, if it is supposed that the terminal is configured to accept a $1 wager, each time a user wagers $1, the total coin drop meter 218, in one embodiment, is incremented by $1, while the hold meter (if any) is incremented by a predetermined percentage of the wager. For example, if the device is configured to have a constant hold of 10%, for each dollar wagered the hold meter 218 will be incremented by ten cents.

The remaining amount of the wager (i.e., the amount which is not allocated to the hold meter 218) is distributed among the various visible and background prize meters 222*a* through *c,* 224*a* through *c*. This remaining amount may be distributed to the various meters in a number of fashions. Preferably, the distribution is made in a fashion such as to provide a relatively high entertainment value, i.e., to most effectively increase the interest or excitement level of the players. This may, in some situations, vary depending on, e.g., the demographics of the users and the like. Since the amount that will be paid out to a user will equal the amount in the corresponding visible meter for that winning hand or outcome, the prize which is awarded will have already been accumulated based on previous wagers (except, possibly, when a terminal is first installed and has not yet received any wages, in which case the prizes may be, if desired, covered by a "seed" prize distribution contributed by the machine operator).

Preferably, as the amounts in the various meters are incremented, the displays 116 of the potential prizes are updated 316. At this point, the game is played such as by a simulated deal of simulated cards, a simulated slot machine reel spin, a simulated keno outcome and the like 318. If there is no winning outcome, the procedure returns 323 to permit players to place another wager. If there is a win 320, the device authorizes a payout 323 of an amount equal to the amount which has been accumulated in the visible meter 222*a* through 222*c* which compares to the winning game outcome. Once an amount corresponding to a particular visible meter has been paid out, that meter is reset, e.g. to a zero value 324. Although it is possible to re-build the value in a meter from a zero value, it is believed preferable to provide a device in which there will, typically, always be at least some positive value for each potential prize. Thus it is preferred to transfer 326 all or some of the amount in the corresponding background meter 224*a* through 224*c* into the reset visible meter 222*a* through 222*c*. For example, if a player achieves two-of-a-kind in a video poker deal, the player will be given a prize equal to the amount which had been accumulated in the two-of-a-kind visible meter 222*a*. This meter 222*a* will then be reset to zero. All or a portion of the two-of-a-kind background meter 224*a* will then be transferred to the two of a kind visible meter 222*a* so that when the display is updated 328 the corresponding prize display 116*a* will have a non-zero value, which is believed to add to the interest of the game and encourage players to place another wager 312.

Since game outcomes are random or pseudo-random, it is possible, even if unlikely, that a gaming terminal may have two successive wins of a particular prize. Thus, if a user had a win of a two of a kind-type (resulting in transfer of an amount from the corresponding two-of-a-kind background meter 224*a* into the two-of a-kind visible meter 222*a*) and the player thereupon had a second two-of-a-kind win, there would be no amount left in the background meter 224*a,* if the entire amount had been previously transferred to the visible meter 222*a*. Accordingly, in one embodiment, the background meter 224*a* is never allowed to drop to a zero value, such as by always retaining at least a fixed amount or a minimum percentage amount in the background meter 224.

Systems which have included a progressive game have typically involved wagers placed on a plurality of different gaming terminals, often linked by a communications system such as a network, e.g., to a central computer. Although the present invention can be implemented in a networked or linked fashion, it is also possible to implement the present invention as a stand-alone gaming terminal, i.e., in which it is not necessary to share or pool wagers or prizes. Thus, in one embodiment, the invention is implemented on a single terminal such that prizes which are awarded on the basis of the outcome of games played on that terminal are derived exclusively from wagers which were played on that terminal. Thus, in this embodiment, a wager placed on a given terminal is never used to fund a prize which is paid on another terminal. This stand-alone embodiment can also be implemented in a "networked" fashion in which, although there is no sharing or pooling of wagers or prizes, information may be transmitted to a central computer 232 (e.g., for bookkeeping, security and/or accounting purposes) e.g., over modem 124 or using a network card 234, and/or information may be transmitted from the central computer 232 to one or more gaming terminals, e.g., for updating software and the like.

In another embodiment, the present invention can be implemented in a fashion such that one or more of the meters 218, 222, 224 are incremented in response to wagers at two or more networked gaming terminals. Typically, the number of terminals which are pooled together will be related to the wager-to-prize ratio, i.e., when numerous terminals are pooled, it is possible to have relatively large prizes based on relatively small wagers. For example, various systems could be configured such that those machines which provide only (relatively small) prizes for two-of-a-kind or three-of-a-kind winning hands could be implemented as stand-alone terminals, those which provide (somewhat larger) prizes for four-of-a-kind could be implemented as a plurality of terminals (typically less than all) within a casino or other location, those that provide (yet larger) prizes for winning hands up through, e.g., a straight, could be implemented for all electronic poker terminals within a casino (or other location), and those which provide (relatively large) prizes for hands up through a royal flush could be implemented by linking gaming terminals located in several locations, such as several casinos via a wide area link. It is also possible to provide a hybrid gaming terminal in which some prizes are implemented in a stand-alone fashion and other prizes are implemented as local, casino-wide or wide area links. Other groupings and communication links can also be provided as will be apparent to those of skill in the art after understanding the present invention.

In light of the above description, a number of advantages of the present invention can be seen. The present invention provides for a gaming system that achieves substantially unpredictable, such as random, win distribution while permitting the system to achieve a substantially constant, non-volatile hold percentage, even when the hold percentage is considered on a win-to-win basis. The present invention permits the implementation of a system which contains no banked games, i.e., in which all prizes (even those resulting from wins which, through the operation of randomness, occur relatively close together) are funded entirely by previous wagers rather than requiring the house or "bank" to cover prizes. The present invention permits a gaming system to be implemented in which all prizes can increment through time, as multiple wagers are placed, which is believed to add to the entertainment value and interest in the game.

A number of variations and modifications of the invention can also be used. Although the invention has been described in connection with a simulated poker game, the invention can also be implemented with other types of simulated card games, or other games such as an electronic keno game, an electronic slot machine game, an electronic roulette game and the like. Although the invention has been described in terms of gaming terminals such as may be found in casinos, the invention can also be implemented on other types of devices such as desktop or laptop personal computers, including those communicating over groups of networks such as the Internet. The present invention permits great control over the hold value. Although it is anticipated that this control will be used to establish a non-volatile or constant hold, this control could also be used to implement a hold value which varied, e.g., for marketing purposes (at different times of the day, or in different locations, or in response to the current prize amounts or configurations). Freeing the hold value from volatility which is based on the randomness of the win distribution permits the system to be configured such that the hold can be controlled in any of a variety of fashions, whether a constant hold is desired or some changeable hold, e.g., for marketing purposes.

Similarly, the device may be configured such that the percentages of various wagers which are distributed to the various prize meters may be changed, e.g., for marketing purposes, such as by changing the distribution by time of day, location, current prize amount distribution, play history for the terminal and the like.

In one embodiment, rather than having separate visible and background meters, a single meter may be provided with the amount to be retained for future games (i.e., not paid out in response to a win) being calculated as a fixed amount or percentage of the value in the prize meter. Although in the depicted embodiment a separate prize meter is provided for each prize, it is also possible to provide a single prize meter with a predetermined percentage of the prize to be awarded depending on the type of winning outcome which is achieved (e.g., two-of-a-kind results in 5% of the amount in the prize meter, royal flush results in 90% of the amount in the prize meter).

Although the invention has been described by way of an embodiment which stores prize information in various meters, it is also possible to dynamically calculate each prize and hold value rather than storing an accumulated amount in a separate memory location associated with each prize. For example, it may be possible to store only the total amount wagered since the last prize and a percent of total defining each prize.

The allocation of non-hold portions of each wager to various prizes (in those games which have more than one prize) can be done in various fashions. Each prize may be entitled to a percentage of each wager (e.g., the two-of-a-kind prize receives 3% of each wager, the royal flush receives 15% of each wager). It is possible to configure a system in which the percentages change through time, e.g., to achieve various marketing goals. It is also possible to configure the system such that some prizes do not receive any portion of certain wagers (e.g., such that $1 wager have 0% distributed to the royal flush meter while $5 wagers have 0% distributed to the two of-a-kind meter). It is also possible to distribute non-held portions of the wager among the prizes depending on the current distribution of prizes, e.g., to provide the largest contribution towards those prizes which are currently at the smallest value.

Although the present invention has been described by way of a preferred embodiment and certain variations and modifications, other variations and modifications can also be used, the invention being defined by the following claims.

What is claimed is:

1. A computer-implemented method for playing a game, by a plurality of players, comprising:

defining at least a first plurality of predetermined winning outcomes, each associated with at least one of a plurality of prizes, each prize defining a prize amount, wherein said plurality of predetermined winning outcomes and associated prizes are selected so as to define a hold for said game;

accepting a plurality of wagers, each wager permitting a play of said game;

monitoring a total of wagers, less any prize amounts awarded;

displaying to said player on visible meters the amounts of said plurality of prizes associated with said predetermined winning outcomes, the displayed amounts escalating as additional wagers are accepted;

maintaining at least one undisplayed background meter representing a starting amount for a predetermined winning outcome;

for each play of said game, selecting whether said play of said game results in one of said plurality of winning outcomes and, if so, awarding said prize associated with said predetermined winning outcome, wherein said selecting is performed to provide a substantially unpredictable, random win distribution, at least for said first plurality of predetermined winning outcomes; while subdividing said wagers to selectively distribute portions thereof to a hold meter for defining said hold, said visible meters, and said undisplayed background meter; and, upon awarding of a prize, transferring the value of said undisplayed background meter to the visible meter which displayed the prize awarded;

wherein an amount of any one prize is dependent on said total amount wagered by said plurality of players;

wherein the amount of any particular one of said plurality of prizes is unaffected by the amount of winnings of other players; and wherein said hold is substantially based on the number of wages, and unrelated to said random win distribution, at least for said first plurality of predetermined winning outcomes.

2. A method, as claimed in claim 1, wherein said step of defining a first plurality of predetermined winning outcomes is performed on a central computer linked to a plurality of gaming terminals.

3. A method, as claimed in claim 1, further comprising establishing a pool of prizes.

4. A method, as claimed in claim 1, wherein said game is selected from among a poker game, a simulated card game, a keno game, a slot machine game and a roulette game.

5. A method, as claimed in claim 1, further comprising allocating a portion of each said wager to each of said prizes associated with said winning outcomes.

6. A method, as claimed in claim 5, wherein said allocated portions of each said wager are stored in a plurality of background meters.

7. A method, as claimed in claim 1, wherein a total amount of said prizes differs from said total amount wagered by a hold amount.

8. The method of claim 1 in which selected portions of said wagers are distributed to a plurality of said undisplayed background meters, and a specific background meter transfers its value to a selected visible meter as a prize is awarded.

9. Apparatus for playing a game, by a player, comprising:

a computer configured to store information defining at least a first plurality of predetermined winning outcomes, each associated with at least one of a plurality of prizes, each prize defining a prize amount, wherein said plurality of predetermined winning outcomes and associated prizes is selected so as to define a hold for said game;

a wager acceptor which accepts a plurality of wagers, each wager permitting a play of said game;

an undisplayed background meter representing a starting amount for a predetermined winning outcome;

memory for storing a total amount wagered less any prize amounts awarded;

a display, having visible meters, wherein amounts of said prizes associated with said predetermined winning outcomes are displayed to said player and escalate when additional wagers are accepted by the wager acceptor;

apparatus for selecting, for each play of said game, whether said play of said game results in one of said plurality of winning outcomes and, if so, awarding said prize associated with said predetermined winning outcome, wherein said apparatus for selecting provides a substantially unpredictable, random win distribution, at least for said first plurality of predetermined winning outcomes;

apparatus for subdividing each wager to selectively distribute portions thereof to a hold meter for defining said hold, said visible meters, and said undisplayed background meter; and apparatus for transferring the value of the undisplayed background meter, upon awarding of a prize to the visible meter which displayed the prize awarded;

wherein an amount of any one prize is dependent on said total amount wagered by a plurality of players;

wherein the amount of any particular one of said plurality of prizes is unaffected by the amount of winnings of other players; and wherein said hold is substantially based on the amount of wagers, and unrelated to said random win distribution, at least for said first plurality of predetermined winning outcomes.

10. Apparatus, as claimed in claim 9, wherein said computer is linked to a plurality of gaming terminals.

11. Apparatus, as claimed in claim 9, wherein said computer establishes a pool of prizes.

12. Apparatus, as claimed in claim 9, wherein said game is selected from among a poker game, a simulated card game, a keno game, a slot machine game and a roulette game.

13. Apparatus, as claimed in claim 9, wherein a portion of each said wager is allocated to each of said prizes associated with said winning outcomes.

14. Apparatus, as claimed in claim 13, wherein said allocated portions of each said wager are stored in a plurality of background meters.

15. Apparatus, as claimed in claim 9, wherein a total amount of said prizes differs from said total amount wagered by a hold amount.

16. A computer-implemented method for playing a game, by a plurality of players, comprising:

defining at least a first plurality of predetermined winning outcomes, each associated with at least one of a plurality of prizes, each prize defining a prize amount, wherein said plurality of predetermined winning outcomes and associated prizes are selected so as to define a hold for said game;

accepting a plurality of wagers, each wager permitting a play of said game;

monitoring a total amount of wagers, less any prize amounts awarded;

displaying to said player, on visible meters, the amounts of said prizes associated with said predetermined winning outcomes;

for each play of said game, selecting whether said play of said game results in one of said plurality of winning outcomes and, if so, awarding said prize associated with said predetermined winning outcome, wherein said selecting is performed to provide a substantially unpredictable, random win distribution, at least for said first plurality of predetermined winning outcomes, while allocating a portion of each said wager to each of said prizes associated with said winning outcomes by subdividing each wager to selectively distribute portions thereof to a hold meter for defining said hold, said visible meters, and undisplayed background meters; and, upon awarding of a prize, transferring the value of one of said undisplayed background meters to the visible meter which displayed the prize awarded;

wherein an amount of any one prize is dependent on said total amount wagered;

wherein the amount of any particular one of said plurality of prizes is unaffected by the amount of winnings of other players;

wherein said hold is substantially based on the number of wagers, and unrelated to said random win distribution, at least for said first plurality of predetermined winning outcomes;

wherein said allocated portions of each said wager are stored in a plurality of background meters; and wherein said prizes associated with said predetermined outcomes are displayed by said plurality of display meters, and wherein an amount in one of said display meters is less than an amount in a corresponding background meter by a hold amount.

17. Apparatus for playing a game, by a player, comprising:

a computer configured to store information defining at least a first plurality of predetermined winning outcomes, each being associated with at least one of a plurality of prizes, each prize defining a prize amount, wherein said plurality of predetermined winning outcomes and associated prizes is selected so as to define a hold for said game;

a wager acceptor which accepts a plurality of wagers, each wager permitting a play of said game and being subdivided to selectively distribute portions thereof to a hold meter for defining said hold, a plurality of visible meters, and a plurality of undisplayed background meters;

memory for storing a total amount wagered less any prize amounts awarded;

said visible meters displaying amounts of said prizes associated with said predetermined winning outcomes to said player;

apparatus for selecting, for each play of said game, whether said play of said game results in one of said plurality of winning outcomes and, if so, awarding said prize associated with said predetermined winning outcome, wherein said apparatus for selecting provides a substantially unpredictable, random win distribution, at least for said first plurality of predetermined winning outcomes;

wherein an amount of any one prize is dependent on said total amount wagered;

wherein the amount of any particular one of said plurality of prizes is unaffected by the amount of winnings of other players;

wherein said hold is substantially predetermined and unrelated to said random win distribution, at least for said first plurality of predetermined winning outcomes, wherein a portion of each said wager is allocated to each of said prizes associated with said winning outcomes;

wherein said allocated portions of each said wager are stored in a plurality of said background meters; and wherein said prizes associated with said predetermined outcomes are displayed, and wherein an amount displayed with respect to a one of said prize amounts is less than an amount in a corresponding background meter.

18. A computer-implemented method for receiving money wagers in a game having defined, predetermined winning outcomes, each associated with at least one of a plurality of prizes, each prize defining a prize amount, which comprises: accepting a plurality of wagers, each wager permitting a play of said game; subdividing individual wagers to selectively distribute portions thereof to a hold meter, to a plurality of visible meters which display said prize amounts, and to at least one undisplayed background meter; and, upon a player achieving a predetermined winning outcome, signaling the player concerning awarding of a prize; and tranferring the value of an undisplayed background meter to the visible meter which indicated the prize awarded.

19. A computer-implemented method for playing a game by a player, comprising:

defining at least a first plurality of predetermined winning outcomes, each associated with at least one of a plurality of prizes, each prize defining a prize amount, wherein said plurality of winning outcomes and associated prizes are selected so as to define a hold for said game;

accepting a plurality of wagers, each wager permitting a play of said game;

monitoring a total amount of wagers, less any prize amounts awarded;

allocating a portion of each said wager to each of said prizes associated with said winning outcomes; displaying to said player amounts of said prizes associated with said predetermined winning outcomes, the displayed amounts escalating as additional wagers are accepted;

maintaining an undisplayed background meter representing a starting amount for a predetermined winning outcome; allocated portions of each said wager being stored in a plurality of said background meters;

for each play of the game, selecting whether said play of said game resultsin one of said plurality of winning outcomes and, if so, awarding said prize associated with said predetermined winning otcome, wherein said selecting is performed to provide a substantially unpredictable, random win distribution, at least for said first of predetermined winning outcomes, wherein said prizes associated with said predetermined outcome are displayed by a plurality of display meters, and wherein an amount in one of said display meters is less than amount in a corresponding background meter by a hold amount;

wherein an amount of any one prize is dependent on said total amount wagered by a plurality of players;

wherein the amount of any particular one of said plurality of prizes is unaffected by the amount of winnings of other players; and wherein said hold is substantially constant and unrelated to said random win distribution, at least for said first plurality of predetermined winning outcomes.

20. Apparatus for playing a game, by a player, comprising:

a computer configured to store information defining at least a first plurality of predetermined winning outcomes, each associated with at least one of a plurality of prizes, each prize defining a prize amount, wherein said plurality of predetermined winning outcomes and associated prizes is selected so as to define a hold for said game;

a wager acceptor which accepts a plurality of wagers, each wager permitting a play of said game;

an undisplayed background meter representing a starting amount for a predetermined winning outcome;

memory for storing a total amount wagered less any prize amounts awarded;

a display wherein amounts of said prizes associated with said predetermined winning outcomes are displayed to said player and escalate when additional wagers are accepted by the wager acceptor, a portion of each said wager being allocated to each of said prizes associated with said winning outcomes, allocated portions of each said wager being stored in a plurality of background meters;

apparatus for selecting, for each play of said game, whether said play of said game results in one of said plurality of winning outcomes, and if so, awarding said prize associated with said predetermined winning outcome, wherein said apparatus for selecting provides a substantially unpredictable, random win distribution, at least for said first plurality of predetermined winning outcomes;

wherein an amount of any one prize is dependent on said total amount wagered by a plurality of players, said prizes being associated with said predetermined outcomes being displayed; and wherein an amount displayed with respect to a one of said prize amounts is less than an amount in a corresponding background meter by a hold amount;

wherein an amount of any one prize is dependent on said total amount wagered by a plurality of players;

wherein the amount of any particular one of said plurality of prizes is unaffected by the amount of winnings of other players; and wherein said hold is substantially constant, and unrelated to said random win distribution, at least for said first plurality of predetermined winning outcomes.

21. A computer-implemented method for playing a game, by a player, comprising:

defining at least a first plurality of predetermined winning outcomes, each associated with at least one of a plurality of prizes, each prize defining a prize amount, wherein said plurality of predetermined winning outcomes and associated prizes is selected so as to define a hold for said game;

accepting a plurality of wagers, each wager permitting a play of said game;

monitoring a total amount of wagers, less any prize amounts awarded;

displaying to said player amounts of said prizes associated with said predetermined winning outcomes, the displayed amounts escalating as additional wagers are accepted;

maintaining an undisplayed background meter representing a starting amount for a predetermined winning outcome;

for each play of said game, selecting whether said play of said game results in one of said plurality of winning outcomes and, if so, awarding said prize associated with said predetermined winning outcome, wherein said selecting is performed to provide a substantially unpredictable, random with distribution, at least for said first plurality of predetermined winning outcomes;

wherein an amount of any one prize is dependent on said total amount wagered by a plurality of players;

wherein the amount of any particular one of said plurality of prizes is unaffected by the amount of winnings of other players;

and wherein said hold is substantially constant and unrelated to said random win distribution, at least for said first plurality of predetermined winning outcomes.

22. Apparatus for playing a game, by a player, comprising;

a computer configured to store information defining at least a first plurality of predetermined winning outcomes, each associated with at least one of a plurality of prizes, each prize defining a prize amount, wherein said plurality of predetermined winning outcomes and associated prizes is selected so as to define a hold for said game;

a wager acceptor which accepts a plurality of wages, each wager permitting a play of said game;

an undisplayed background meter representing a starting amount for a predetermined winning outcome;

memory for storing a total amount wagered less any prize amounts awarded;

a display wherein amounts of said prizes associated with said predetermined winning outcomes are displayed to said player and escalate when additional wagers are accepted by the wager acceptor;

means for selecting, for each play of said game, whether said play of said game results in one of said plurality of winning outcomes and, if so, awarding said prize associated with said predetermined winning outcome, wherein said means for selecting provides a substantially unpredictable, random win distribution, at least for said first plurality of predetermined winning outcomes; wherein an amount of any one prize is dependent on said total amount wagered by a plurality of players;

wherein the amount of any particular one of said plurality of prizes is unaffected by the amount of winnings of other players;

and wherein said hold is substantially constant, and unrelated to said random win distribution, at least for said first plurality of predetermined winning outcomes.

23. A computer-implemented method for playing a game, by a player, comprising:

defining at least a first plurality of predetermined winning outcomes, each associated with at least one of a plurality of prizes, each prize defining a prize amount, wherein said plurality of predetermined winning outcomes and associated prizes is selected so as to define a hold for said game;

accepting a plurality of wagers, each wager permitting a play of said game;

monitoring a total amount of wagers, less any prize amounts awarded;

displaying to said player amounts of said prizes associated with said predetermined winning outcomes;

for each play of said game, selecting whether said play of said game results in one of said plurality of winning outcomes and, if so, awarding said prize associated with said predetermined winning outcome, wherein said selecting is performed to provide a substantially unpredictable, random with distribution, at least for said first plurality of predetermined winning outcomes;

allocating a portion of each said wager to each of said prizes associated with said winning outcomes wherein an amount of any one prize is dependent on said total amount wagered;

wherein the amount of any particular one of said plurality of prizes is unaffected by the amount of winnings of other players;

wherein said hold is substantially constant, and unrelated to said random win distribution, at lest for said first plurality of predetermined winning outcomes;

wherein said allocated portions of each said wager are stored in a plurality of background meters;

and wherein said prizes associated with said predetermined outcomes are displayed by a plurality of display meters, and wherein an amount in a one of said display meters is less than an amount in a corresponding background meter by a hold amount.

24. Apparatus for playing a game, by a player, comprising:

a computer configured to store information defining at least a first plurality of predetermined winning outcomes, each associated with at least one of a plurality of prizes, each prize defining a prize amount, wherein said plurality of predetermined winning outcomes and associated prizes is selected to as to define a hold for said game;

a wager acceptor which accepts a plurality of wagers, each wager permitting a play of said game;

memory for storing a total amount wagered less any prize amounts awarded;

a display wherein amounts of said prizes associated with said predetermined winning outcomes are displayed to said player;

means for selecting, for each play of said game, whether said play of said game results in one of said plurality of winning outcomes and, if so, awarding said prize associated with said predetermined winning outcome, wherein said means for selecting provides a substantially unpredictable, random win distribution, at least for said first plurality of predetermined winning outcomes;

wherein an amount of any one prize is dependent on said total amount wagered;

wherein the amount of any particular one of said plurality of prizes is unaffected by the amount of winnings of other players;

wherein said hold is substantially constant and unrelated to said random win distribution, at least for said first plurality of predetermined winning outcomes;

wherein a portion of each said wager is allocated to each of said prizes associated with said winning outcomes;

wherein said allocated portions of each said wager are stored in a plurality of background meters; and wherein said prizes associated with said predetermined outcomes are displayed, and wherein an amount displayed with respect to a one of said prize amounts is less than an amount in a corresponding background meter by a hold amount.

* * * * *

UNITED STATES PATENT AND TRADEMARK OFFICE
CERTIFICATE OF CORRECTION

PATENT NO. : 6,290,603 B1
DATED : September 18, 2001
INVENTOR(S) : Robert Luciano, Jr.

It is certified that error appears in the above-identified patent and that said Letters Patent is hereby corrected as shown below:

Column 1,
Line 55, cancel "there" and insert in place thereof -- these --.
Line 61, cancel "baked" and insert -- banked --.

Column 6,
Line 56, after "game" cancel the comma.

Column 7,
Line 29, cancel "wages" and insert -- wagers --.

Column 8,
Line 9, cancel "provides" and insert -- comprises --.
Line 24, cancel "amount of".

Column 9,
Line 2, cancel "first".
Line 64, after -- outcomes -- cancel the comma and insert a semicolon.

Column 10,
Line 18, cancel "tranferring" and insert -- transferring --.
Line 45, cancel "resultsin" and insert -- results in --.
Line 47, cancel "otome" and insert -- outcome --.
Line 50, after "first" insert -- plurality --.

Column 12,
Line 3, cancel "with" and insert -- win --.
Line 15, after "comprising" cancel the semicolon and insert a colon.

Signed and Sealed this

Eleventh Day of February, 2003

JAMES E. ROGAN
*Director of the United States Patent and Trademark Office*